US009544047B2

(12) United States Patent
Sampigethaya

(10) Patent No.: US 9,544,047 B2
(45) Date of Patent: Jan. 10, 2017

(54) SYSTEM AND METHOD TO PREVENT MISUSE OF AIRCRAFT MESSAGES

(71) Applicant: The Boeing Company, Chicago, IL (US)

(72) Inventor: Radhakrishna G Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 904 days.

(21) Appl. No.: 13/874,862

(22) Filed: May 1, 2013

(65) Prior Publication Data
US 2014/0327564 A1 Nov. 6, 2014

(51) Int. Cl.
*H04B 7/185* (2006.01)
*G08G 5/00* (2006.01)
*H04L 9/32* (2006.01)

(52) U.S. Cl.
CPC ........ *H04B 7/18506* (2013.01); *G08G 5/0008* (2013.01); *G08G 5/0013* (2013.01); *H04L 9/3215* (2013.01)

(58) Field of Classification Search
CPC . H04B 7/18506; H04L 9/3215; G08G 5/0008; G08G 5/0013; H04K 1/10; H04K 1/02
See application file for complete search history.

(56) References Cited

U.S. PATENT DOCUMENTS

| 4,564,840 | A | * | 1/1986 | Brisse | ........................ | G01S 1/04 342/47 |
| 8,248,294 | B2 | | 8/2012 | Sampigethaya et al. | | |
| 2011/0057830 | A1 | | 3/2011 | Sampigethaya et al. | | |

OTHER PUBLICATIONS

Haley et al.; "Security Requirements Engineering: A Framework for Representation and Analysis"; IEEE Transactions on Software Engineering; vol. 34 No. 1; Jan. 2008; p. 133-153.
Sampigethaya et al.; "Secure Operation, Control, and Maintenance of Future E-Enabled Airplanes"; Proceedings of the IEEE; vol. 96 No. 12; Dec. 2008; p. 1992-2007.
Sampigethaya et al.; "Security and Privacy of Future Aircraft Wireless Communications with Offboard Systems"; IEEE Third Int. Conf. on Comm. Systems and Networks (COMSNETS); 2011; 6 pages.
Great Britain Application No. 1404264.2; Combined Search and Examination Report; dated Sep. 12, 2014; 6 pages.
Scott Stewart, "The Continuing Threat of Libyan Missiles", Stratfor Global Intelligence, May 3, 2012, at URL: << http://www.stratforcom/weekly/continuing-threat-libyan-missiles>>.

(Continued)

*Primary Examiner* — John Q Nguyen
*Assistant Examiner* — Michael Kerrigan
(74) *Attorney, Agent, or Firm* — Baker & Hostetler LLP

(57) ABSTRACT

An avionics system allows aircraft to introduce bogus "ADS-B Out" messages that are recognized as false only by authorized users. The system enables aircrafts flying at low altitudes to prevent misuse of their ADS-B Out information by maliciously operated cyber and physical attack tools. Aspects of the illustrative embodiment include the system architecture, including an Airborne ATC Processor and Ground ATM System Processor; a process employed by aircraft for generating authorized bogus ADS-B Out messages; a process employed by aircraft for transmitting authorized bogus ADS-B Out messages; and a process employed by air traffic control and other aircraft for decoding the authorized bogus ADS-B Out messages.

19 Claims, 4 Drawing Sheets

(56) References Cited

OTHER PUBLICATIONS

Detlof von Winterfeldt and Terrence M. O'Sullivan, "Should We Protect Commercial Airplanes Against Surface-to-Air Missile Attacks by Terrorists?", Decision Analysis vol. 3, No. 2, Jun. 2006, pp. 63-75.

Federal Register, Part III, 14 CFR Part 91 (ADS-B), May 28, 2010, 37 pages. at URL: << http://www.aviationmanuals.com/references/2012-01/Federal_Register_Part_III_14_CFR_Part_91_ADS_B.pdf>>.

* cited by examiner

SYSTEM AND METHOD TO PREVENT MISUSE OF AIRCRAFT MESSAGES

TECHNICAL FIELD

The present disclosure relates generally to the field of avionics, and more particularly to systems and methods for enabling aircraft to prevent misuse of their ADS-B Out information for malicious cyber and physical attacks.

BACKGROUND

Automatic dependent surveillance-broadcast (ADS-B) is a surveillance technology for tracking aircraft as part of the Next Generation Air Transportation System (NextGen). The United States will require aircraft operating within its airspace to be equipped with some form of "ADS-B Out" by Jan. 1, 2020. ADS-B, which includes two different services, "ADS-B Out" and "ADS-B In", will replace radar as the primary surveillance method for controlling aircraft worldwide. ADS-B enhances safety by making an aircraft visible to air traffic control and to other appropriately equipped ADS-B aircraft with identity, position and velocity data transmitted at least once every second. It also provides the data infrastructure for inexpensive flight tracking, planning, and dispatch. The system relies on two avionics components—a high-integrity GNSS navigation source and a datalink (ADS-B transponder). There are several types of certified ADS-B data links, but the most common ones operate at 1090 MHz, essentially a modified Mode S transponder, or at 978 MHz (USA only).

At the present time, two link solutions are being used as the physical layer for relaying the ADS-B messages: (1) Universal Access Transceiver (UAT), and (2) 1,090 MHz Mode S Extended Squitter (1090-ES). A UAT is a data link intended to serve the majority of the general aviation community. The data link is approved for use in all airspace except airspace above 18,000 ft. UAT is intended to support not only ADS-B, but also Flight Information Service-Broadcast (FIS-B), Traffic Information Service-Broadcast (TIS-B), and, if required in the future, supplementary ranging and positioning capabilities. 1090-ES will support ADS-B and TIS-B. Both UAT and 1090-ES will allow aircraft equipped with "Out" broadcast capabilities to be seen by any other aircraft using "ADS-B In" technology as well as by FAA ground stations. Aircraft equipped with ADS-B In technology will be able to see detailed altitude and vector information from other ADS-B Out equipped aircraft.

The Federal Aviation Administration has announced a dual link decision using 1090-ES and UAT as media for the ADS-B system in the United States, with the 1090-ES ADS-B link for air carrier and private or commercial operators of high-performance aircraft, and UAT ADS-B link for the typical general aviation user. With 1090-ES, the existing Mode S transponder supports a message type known as the "extended squitter" (ES) message, which is a periodic message that provides 3-dimensional position (including altitude), velocity, time, and, in the future, intent. To enable an aircraft to send an extended squitter message, the transponder is modified and aircraft position and other status information are routed to the transponder. ATC ground stations and aircraft equipped with traffic collision avoidance system (TCAS) already have the necessary 1090 MHz (Mode S) receivers to receive these signals, and would only require enhancements to accept and process the additional extended squitter information.

All aircraft will soon be mandated to transmit ADS-B Out messages when moving around the world. Civilian unmanned aerial vehicles must also emit ADS-B to operate in the national airspace system. An ADS-B Out message of an aircraft contains the aircraft's 24-bit universal identity (e.g., International Civil Aviation Organization, or ICAO, identifier), global navigation satellite system (GNSS) precision position (including geometric altitude), barometric altitude, velocity, and time, and other flight trajectory spatial information. The ADS-B transmission of an aircraft occurs every second and reaches receivers beyond 100 miles from the aircraft. Consequently, anyone with an inexpensive ADS-B receiver can passively track in real-time each flight of each aircraft within the receiver's radio range, with high spatial and temporal precision. This ADS-B based flight tracking information can be misused by malicious entities targeting the aviation sector.

A problem addressed by the inventive system described herein is the possible misuse of ADS-B Out messages by attackers possessing cyber-attack tools, such as software-defined radio based ADS-B or GNSS signal spoofers or jammers, and physical attack tools, such as surface-to-air weapon systems. It is assumed these attackers are aiming to physically disrupt the air transportation system and unmanned aircraft (also called unmanned aerial vehicles, or UAVs) by attempting to destroy a targeted aircraft/UAV. ADS-B and GNSS spoofing/jamming, and surface-to-air weapon based threats are emerging threats for aircraft. Surface-to-air threats, for example, has been successfully instantiated on aircraft and UAVs at low altitudes (relative to terrain) or when a passenger/cargo aircraft is in critical flight phases in the terminal area (such as approach, landing, takeoff and departure). With technology advances, the range of surface-to-air threats may increase further in the future to threaten aircraft and UAVs during other flight phases and operations. By providing precise, high granularity, 4-D position information of each airborne aircraft and UAV, ADS-B Out messages may increase the exposure, likelihood, impact, and success of cyber threats, such as those from ADS-B and GNSS spoofing and jamming attacks, as well as physical threats, such as those from surface-to-air weapon attacks, to aircraft and UAVs.

The following references may be reviewed for additional background information (printed copies are being provided with an Information Disclosure Statement submitted with this application): (Ref1) Scott Stewart, "The Continuing Threat of Libyan Missles," Stratfor.com, Security Weekly; (Ref2) Detlof von Winterfeldt and Terrence M. O'Sullivan, "Should We Protect Commercial Airplanes Against Surface-to-Air Missile Attacks by Terrorists?," Decision Analysis vol. 3, no. 2, June 2006, pages 63-75; (Ref3) Federal Aviation Administration, "Automatic Dependent Surveillance-Broadcast (ADS-B) Out Performance Requirements To Support Air Traffic Control (ATC) Service," Federal Register Vol. 75, No. 103, May 28, 2010; (Ref4) Sampigethaya, R. G. and Poovendran, R. and Bushnell, L., METHOD FOR VALIDATING AIRCRAFT TRAFFIC CONTROL DATA, U.S. patent application Ser. No. 12/841, 349, 2010; (Ref5) Sampigethaya, R. G. and Poovendran, R., METHOD FOR PROTECTING LOCATION PRIVACY OF AIR TRAFFIC COMMUNICATIONS, U.S. Pat. No. 8,248, 294 B2, Aug. 21, 2012.

As reflected in the background references noted above, no solutions for preventing misuse of ADS-B Out messages currently exist. ADS-B is intentionally designed to be unencrypted and openly accessible and beneficial to all systems operating in the airspace. Outfitting and maintaining the entire U.S. airline fleet with a military aircraft class of countermeasures that could foil missiles would be prohibitively expensive (e.g., cost over $40 billion), and the bulk of the civilian aviation fleet worldwide remains undefended today (see Ref2). Moreover, ADS-B provides a side channel for enhancing cyber and physical threats, and reducing the effectiveness and devaluing existing countermeasures.

SUMMARY

The present invention is preferably embodied in a system and method that allows manned and unmanned aircraft to introduce bogus (i.e., false or dummy) "ADS-B Out" messages that are recognized as false only by authorized users. The inventive system enables commercial and business aircrafts and UAVs flying at low altitudes to prevent misuse of their ADS-B Out information by maliciously operated cyber and physical attack tools, such as ADS-B spoofers and jammers and surface-to-air missile/weapon systems. Aspects of the illustrative embodiment described below include the system architecture, including an Airborne ATC Processor and Ground Air Traffic Management (ATM) System Processor; a process employed by aircraft for generating authorized bogus ADS-B Out messages; a process employed by aircraft for transmitting authorized bogus ADS-B Out messages; and a process employed by air traffic control and other aircraft for decoding the authorized bogus ADS-B Out messages.

Moreover, the embodiments described herein may be used by an aircraft obtaining the authorized bogus messages (or partial information that helps the aircraft to generate bogus messages) from an authorized ground system. The ground system in this scenario may perform the computation of bogus ADS-B Out messages for the aircraft, based on the universal knowledge of ongoing flights in the airspace surrounding the aircraft. The computed information may include the set of ADS-B Out messages, or a difference limit that would avoid a conflict with flight trajectories of neighbors. This computed information is preferably encrypted by the ground system and sent to the aircraft, before the aircraft approaches the vulnerable region/airspace. Accordingly, the present invention does not require that the generation of bogus ADS-B Out messages be performed by an aircraft. The inventive process may also take place partially or completely in off-board systems that are authorized by the aircraft and with an encrypted communication link to the aircraft.

Illustrative embodiments of the present invention include, without limitation, a method, system, and computer readable medium. An illustrative embodiment of a method in accordance with the invention prevents the malicious misuse of an aircraft's transmitted position and movement data by inserting false information into the signal transmission of the aircraft, where the signal transmission includes true aircraft position and movement information and false aircraft position and movement information for the first aircraft. Advantageously, the method may also include determining position and movement information of a neighboring aircraft, and computing false movement information for the first aircraft compatible with a flight path of the neighboring aircraft such that the false movement information of the first aircraft does not conflict with the flight path of the neighboring aircraft.

Other features of the inventive system and method are described below. The features, functions, and advantages can be achieved independently in various embodiments or may be combined in yet other embodiments.

BRIEF DESCRIPTION OF THE DRAWINGS

Embodiments of techniques in accordance with the present disclosure are described in detail below with reference to the following illustrations.

DETAILED DESCRIPTION OF ILLUSTRATIVE EMBODIMENTS

Figure 1:
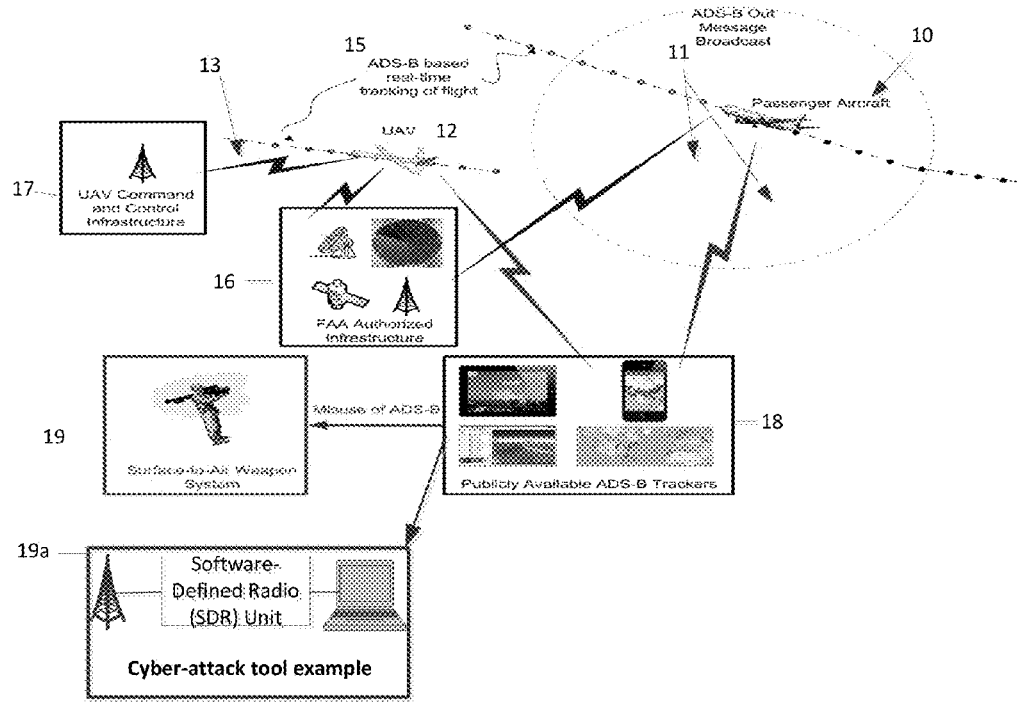
FIG. 1 depicts a system in which aircraft transmit ADS-B Out messages and an attacker operates an unauthorized system to intercept these ADS-B Out messages and feed this data to a weapon system or cyber-attack tool.

The inventive system addresses the new threat of ADS-B misuse for surface-to-air missile attacks. FIG. 1 depicts an aviation system of the kind addressed by the present invention. As shown, the system includes a passenger aircraft 10 that broadcasts ADS-B Out messages 11. Also shown is an unmanned aerial vehicle, or UAV, 12 that similarly broadcasts ADS-B Out messages 13. The passenger aircraft 10 and UAV 12 are shown as traveling along their respective flight paths, which are tracked using the ADS-B information as represented by the lines 15 of FIG. 1. The other components of the system of FIG. 1 include the FAA authorized infrastructure 16, UAV command and control infrastructure 17, and publicly available ADS-B trackers 18. As shown, an ADS-B tracker 18 may be associated with an illicit surface-to-air weapon system 19 or a cyber-attack tool 19a such as a GNSS/ADS-B spoofer/jammer. In the illustrative system, all aircraft transmit ADS-B messages, which are used by the ATM system and UAV operators to monitor and control the aircraft. An attacker operates an unauthorized system to intercept these ADS-B messages and feed this data to an attack tool. The attacker operates in a region of interest, such as near an airport or in a remote terrain where aircraft are relatively at low altitudes.

System Overview

Figure 2:
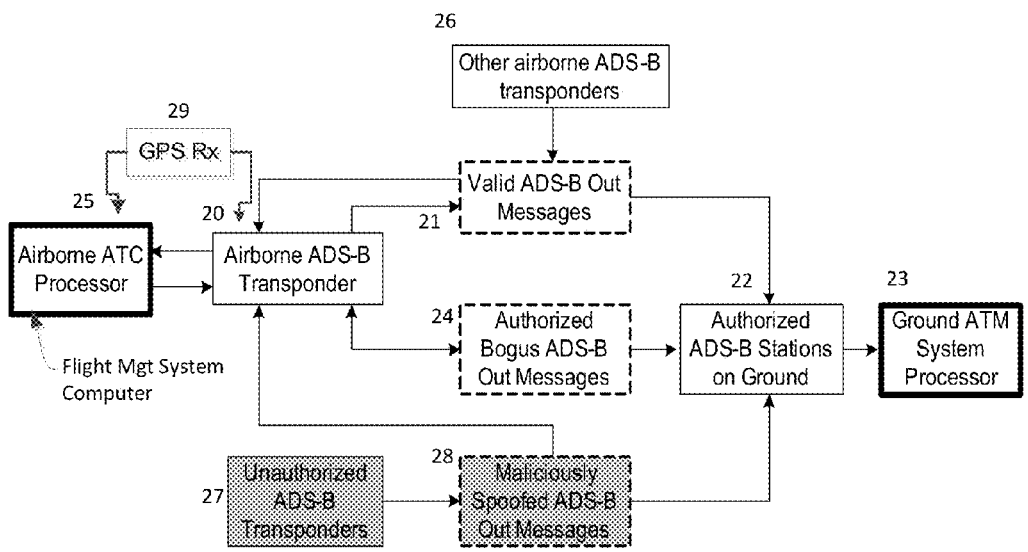
FIG. 2 schematically depicts an illustrative embodiment of the present invention. New components, represented in dark outlined boxes, include an Airborne ATC Processor and Ground ATM System Processor, which include algorithmic methods.

Turning now to the embodiment of FIG. 2, the inventive system enables airborne and ground components to coordinate and safely use ADS-B in the presence of the attacker. Each aircraft in the vulnerable region will transmit a valid message and at least one "authorized bogus" message that is identified as invalid only by authorized users. The difference between the valid message and the bogus message is that fake spatial and temporal data are reported in the bogus message. The intent is to reduce the likelihood of the attacker successfully tracking an actual aircraft in a cyber or physical attack.

The system of FIG. 2 includes an airborne ADS-B transponder 20, which generates valid ADS-B Out messages 21 that are received by one or more authorized ADS-B ground station(s) 22. The authorized ADS-B ground station 22 is in communication with a ground ATM system processor 23. In addition, as discussed above, the airborne ADS-B transponder 20 is also configured to broadcast so-called authorized bogus ADS-B Out messages 24, which are similarly received by the authorized ADS-B ground station 22 and forwarded to the ground ATM system processor 23. As shown in FIG. 2, the inventive system also includes an airborne air traffic control (ATC) processor 25 that is communicatively coupled to the airborne ADS-B transponder 20. Finally, one or more unauthorized ADS-B transponder(s) 27 may be present and operative to broadcast maliciously spoofed ADS-B Out messages 28, which can be received by the authorized ADS-B ground station 22. FIG. 2 indicates the new components—ground ATM system processor 23 and airborne ATC processor 25—in dark outlined boxes. The ADS-B Out messages 21, 24, 28 are denoted in dashed boxes, while the regular outlined boxes 20, 22, 26, 27 represent existing state of the art on the aircraft and ground. As shown, GNSS receiver 29, which is a normal part of an aircraft's navigation system, provides GNSS position and movement (e.g., velocity, acceleration, intended flight path, etc.) information to the ADS-B transponder 20 and the airborne processor 25.

The airborne ATC processor 25 may be implemented as a software application running on an aircraft's flight management system (FMS). Those skilled in the art of avionics understand that a flight management system (FMS) is a fundamental component of a modern airliner's avionics. An FMS is a specialized computer system that automates a wide variety of in-flight tasks, reducing the workload on the flight crew. A primary function is in-flight management of the flight plan. Using various sensors, such as GNSS and an inertial navigation system often backed up by radio-navigation, to determine the aircraft's position, the FMS can guide the aircraft along the flight plan. The ATC processor 25 is able to interface with and provide position information to the ADS-B transponder 20 in the same manner that a conventional FMS is able to interface with the ADS-B transponder 20. However, unlike a conventional FMS, the ATC processor 25 is programmed to cause the ADS-B transponder 20 to transmit authorized bogus ADS-B Out messages 24.

As mentioned, in addition to the "valid" and "authorized bogus" ADS-B Out messages, there may be maliciously spoofed messages 28 over the ADS-B data link that need to be decoded and detected. The ground ATM system 23 is configured to process and distinguish these spoofed messages using data from radar and multilateration infrastructures (see Ref3). The airborne ATC processor 25 is similarly configured with methods (see, e.g., the methods of Ref4) to detect spoofed messages. For example, one way an airborne processor can decode and detect authorized bogus ADS-B Out messages is as follows: the traffic collision avoidance system (TCAS) offers a mechanism for detecting authorized bogus messages of neighboring aircraft within the TCAS radio range. TCAS provides identity and altitude to the verifier. Additionally, the verifier estimates the range and bearing of the neighbor from the response. This provides an actual flight track of the neighbor, and can be used to detect that this neighbor is transmitting bogus ADS-B Out messages. A way to further enable the airborne verifier to determine whether this neighbor is authorized to make bogus ADS-B message transmissions would be: (i) the fact that both aircraft are co-located in the vulnerable region (hence the verifier itself would be transmitting bogus ADS-B Out messages), or (ii) if the verifier is not in the vulnerable region/context then it can coordinate with ground the ATM system to verify that the neighbor is authorized to make bogus ADS-B Out transmissions.

In this regard, we note that solutions for ADS-B location tracking mitigation (Ref5), which use pseudorandom identity and a random time period between two ADS-B Out messages, are not applicable to the surface-to-air weapon threats, primarily because commercial airplanes cannot use a random identity in their ADS-B Out messages due to regulatory restrictions and airspace security reasons. Furthermore, even by randomizing identity, surface-to-air threats still exist to aircraft due to the availability of precise GNSS positions of random aircraft in the anonymized ADS-B Out messages. The solutions described in Ref5 only protect the privacy of operators of aircraft transmitting ADS-B Out.

Generating the Authorized Bogus ADS-B Out Message

Figure 3:
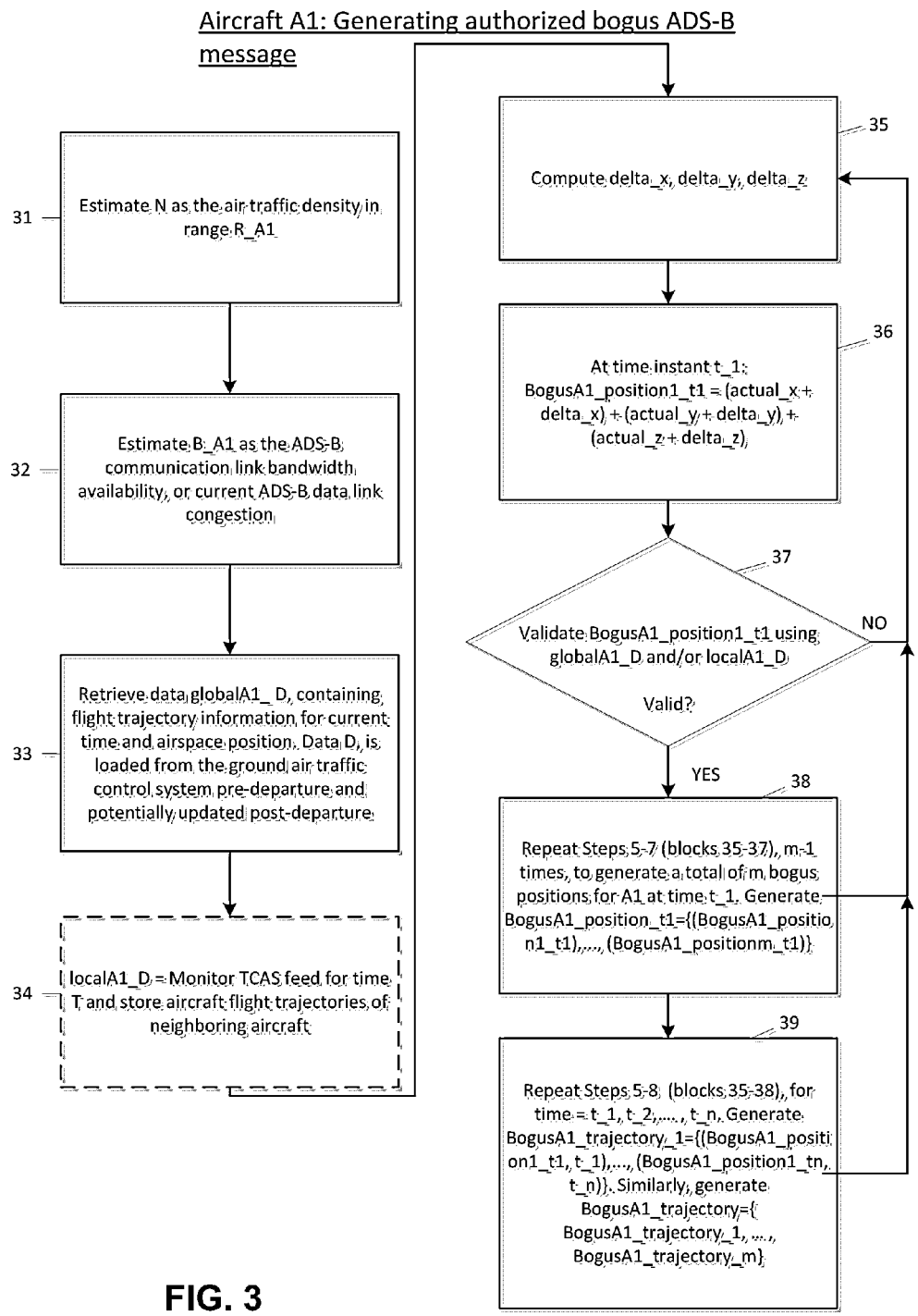
FIG. 3 is a flowchart of a process employed by an aircraft "A1" for generating authorized bogus ADS-B Out messages, in accordance with the illustrative embodiment.

The method used to generate the authorized bogus ADS-B message 24 should ensure that the computed bogus flight trajectory of the aircraft is non-overlapping with actual trajectories of other aircraft in the vicinity. For this purpose, we propose an algorithm that obtains inputs from the air traffic control system on the ground and/or onboard sensors on the aircraft, such as the Traffic Collision and Avoidance System (TCAS). These inputs provide the actual flight trajectories anticipated by aircraft in the vicinity. Consequently, the method implemented on an aircraft can generate bogus flight trajectories that do not coincide with those of other aircraft. An exemplary method for authorized bogus message generation at an aircraft includes the following steps:

(Step 1) Aircraft A1: Estimate N as the air traffic density in range $R\_A1$. (FIG. 3, block 31.)

(Step 2) Aircraft A1: Estimate $B\_A1$ as the ADS-B communication link bandwidth availability, or current ADS-B data link congestion. (FIG. 3, block 32.)

(Step 3) Aircraft A1: Retrieve data $globalA1\_D$, containing flight trajectory information for current time and airspace position. Data D, is loaded from the ground air traffic control system pre-departure and potentially updated post-departure (e.g., via TIS-B). (FIG. 3, block 33.)

(Optional Step 4) Aircraft A1: $localA1\_D$=Monitor TCAS feed for time T and store aircraft flight trajectories of neighboring aircraft. (FIG. 3, block 34.)

(Step 5) Aircraft A1: Compute $delta\_x, delta\_y, delta\_z$, based on a mathematical function of $R\_A1$, $B\_A1$, $actualA1\_position$, $min\_dev$, and a pseudorandom number generator output. $min\_dev$ is the minimum deviation required and computed based on parameters such as radar error margin, TCAS error margin, GNSS error margin, and other known air traffic control system constraints. The output of the mathematical function is $DELTA\_A1\_t1 = (delta\_x, delta\_y, delta\_z)$. (FIG. 3, block 35.)

(Step 6) Aircraft A1: At time instant $t\_1$: $BogusA1\_position1\_t1 = (actual\_x+delta\_x)+(actual\_y+delta\_y)+(actual\_z+delta\_z)$. (FIG. 3, block 36.)

(Step 7) Aircraft A1: Validate $BogusA1\_position1\_t1$ using $globalA1\_D$ and/or $localA1\_D$. If invalid, repeat Steps 5-6. (FIG. 3, block 37.)

(Step 8) Aircraft A1: Repeat Steps 5-7, m−1 times, to generate a total of m bogus positions for A1 at time $t\_1$. Generate $BogusA1\_position\_t1 = \{(BogusA1\_position1\_t1), \ldots, (BogusA1\_positionm\_t1)\}$. (FIG. 3, block 38.)

(Step 9) Aircraft A1: Repeat Steps 5-8, for time=$t1, t\_2, \ldots, t\_n$. Generate $BogusA1\_trajectory\_1 =$ {(BogusA1_position1_t1, t_1), . . . , (BogusA1_position1_tn, t_n)}. Similarly, generate BogusA1_trajectory={BogusA1_trajectory_1, . . . , BogusA1_trajectory_m}. (FIG. 3, block 39.)

It should be noted that this algorithm can generate fake velocity, time, and intent, for inclusion in the ADS-B Out message. The present invention is by no means limited to generation only on the aircraft and the generation of only fake position information. The generation can be done, partially or completely, off-board and securely communicated to the aircraft (as described above) and the generation of fake or bogus velocity, time, and/or intent may also be done.

Transmitting the Authorized Bogus ADS-B Out Messages

Figure 4:
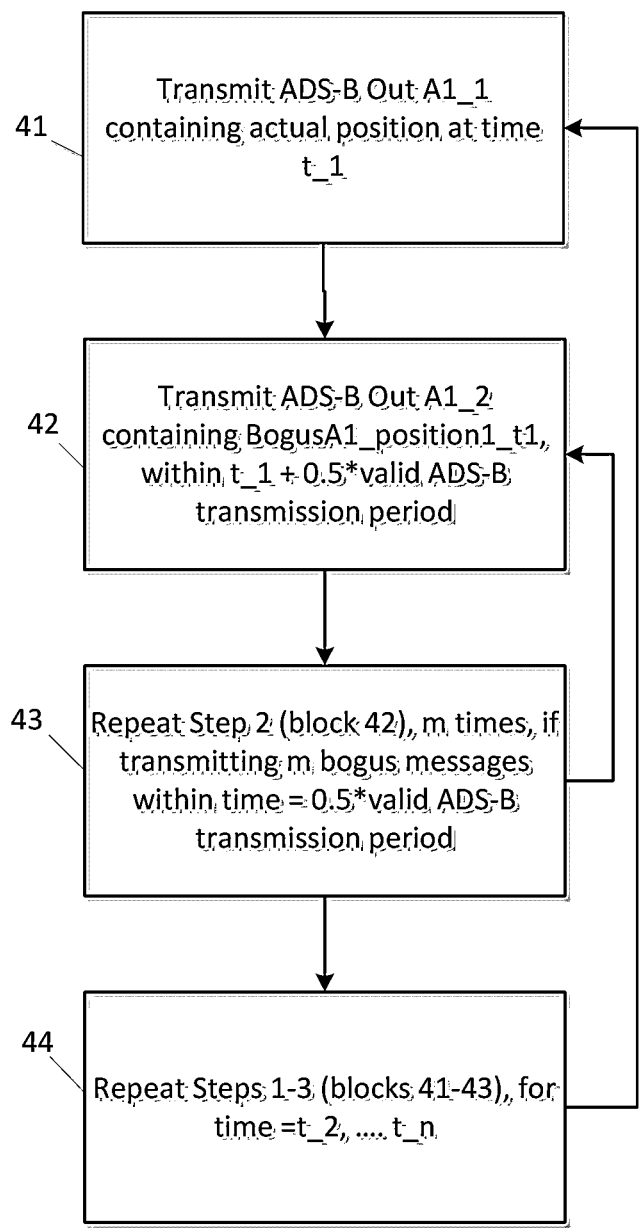
FIG. 4 is a flowchart of a process employed by aircraft A1 for transmitting authorized bogus ADS-B Out messages, in accordance with the illustrative embodiment.

Referring now to FIG. 4, an exemplary method for transmitting the generated authorized bogus ADS-B messages from aircraft includes the following steps:

(Step 1) Aircraft A1: Transmit ADS-B Out A1_1 containing actual position at time t_1. See FIG. 4 block 41.

(Step 2) Aircraft A1: Transmit ADS-B Out A1_2 containing BogusA1_position1_t1, within t_1+0.5*valid ADS-B transmission period. Typical valid ADS-B transmission period is 0.5-1 seconds. See FIG. 4 block 42.

(Step 3) Aircraft A1: Repeat Step 2, m times, if transmitting m bogus messages within time=0.5*valid ADS-B transmission period. See FIG. 4 block 43.

(Step 4) Aircraft A1: Repeat Steps 1-3, for time=t_2, . . . t_n. See FIG. 4 block 44.

Decoding the Authorized Bogus ADS-B Out Messages

Figure 5:
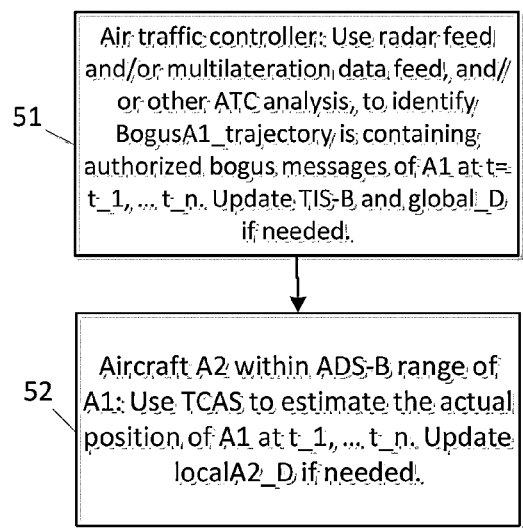
FIG. 5 is a flowchart of a process employed by air traffic control and an aircraft "A2" for decoding the authorized bogus ADS-B Out messages, in accordance with the illustrative embodiment.

Referring now to FIG. 5, an exemplary method for decoding authorized bogus messages at the authorized users includes the following steps:

(Step 1) Air traffic controller: Use radar feed and/or multilateration data feed, and/or other ATC analysis, to identify BogusA1_trajectory is containing authorized bogus messages of A1 at t=t_1, . . . t_n. Update TIS-B and global_D if needed. See FIG. 5 block 51.

(Step 2) Aircraft A2 within ADS-B range of A1: Use TCAS to estimate the actual position of A1 at t_1, . . . t_n. Update localA2_D if needed. See FIG. 5 block 52.

The authorized bogus message generation, transmission, and decoding methods can be selectively initiated under the following scenarios: (1) Surface-to-air weapon threat detection/awareness at the aircraft; (2) threat detection/awareness by ground systems; and (3) pre-existing knowledge of threat likelihood in aircraft traversed regions. This process may also be performed in an always-on system state, or any other predetermined time or portion of a flight path.

ALTERNATIVE EMBODIMENTS

Those skilled in the art will appreciate that various functional elements described above may be implemented in different places, since the place of implementation described herein is a design choice and not a hard requirement. For example, the illustrative embodiment depicted in FIG. 2 includes the airborne ATC processor 25, which is configured to generate bogus position and movement information to be transmitted by the ADS-B transponder 20. This functionality, however, could be performed by a ground-based computer in communication with the airborne ADS-B transponder.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

CONCLUSION

Novel features of the illustrative embodiment described above include the following:

(1) The system allows aircraft to safely transmit ADS-B Out messages while flying over or into geographic regions vulnerable to terrorist or malicious attacks.

(2) For an unauthorized entity, the position in a received ADS-B Out message from an aircraft is not uniquely attributable to that aircraft with high confidence (e.g., probability=1). For an authorized entity, a received ADS-B Out message is uniquely attributable with probability 1 either to that aircraft or to a false aircraft.

(3) The system enables an aircraft to compute potential flight trajectories non-overlapping (not necessarily non-conflicting) with a set of neighbor aircraft.

(4) The system enables an aircraft to use its universally known ICAO identity, and transmit at least two consecutive ADS-B Out messages within 1-2 seconds; one valid message with an actual GNSS location of the aircraft and one or more bogus messages with false spatial and temporal information computed by the aircraft or by an authorized off-board system that is securely communicating with the aircraft.

(5) The system allows the air traffic control system to know the actual flight path of aircraft in a given region by means such as the database with filed flight plans, controller-pilot data link or voice communications, which enables the air traffic control system to identify false ADS-B Out transmissions of that aircraft in the vulnerable region. Furthermore, any misuse of this method (e.g., an intruder aircraft trying to actually fly in an unauthorized flight path) can be prevented by relying on a surveillance radar infrastructure of the air traffic control system, as is done today to track unauthorized flight deviations and intruder flying objects. For example, in the set of anomalous ADS-B Out messages received by a ground ATM system, both the authorized bogus and the maliciously spoofed ADS-B Out messages will fail the multilateration and radar based verifications. These verification mechanisms use the radio signal-based measurements to verify the data integrity of a received ADS-B message. The tracks available from radar/multilateration and ADS-B systems will not match. The identifiers may be used to access additional databases that can show if an aircraft transmitting anomalous ADS-B Out messages is authorized to do so. The ground ATM system processor may use a database with filed flight plans of identifiable aircraft, or controller pilot data/voice communications (before entering the vulnerable region) to identify that those aircraft whose identities are in the received false/spoofed/bogus ADS-B Out messages are authorized to transmit bogus ADS-B Out messages. The ground ATM processor may also use pre-shared knowledge with the aircraft such as the time period of the filed flight plan during which the aircraft will transmit bogus ADS-B Out messages. This information can be predetermined and known to both the ATM processor and the aircraft.

(6) In the absence of radar coverage or accurate flight path knowledge at the air traffic control system, e.g., when aircraft are flying over remote mountainous terrains or scenarios where the pilot has the authority to decide tactical maneuvers, a group of neighbor aircraft can coordinate to ensure they can use false information in their ADS-B Out messages without unnecessarily alarming each other.

(7) The system can ensure that cyber and physical attack tools are not able to target aircraft based on the target's ADS-B Out messages.

(8) Theoretically, the system can ensure the likelihood of a cyber or physical threat is no more than that from targeting assets in an airspace randomly or based on publicly available knowledge of commercial flights.

Compared to current and planned cyber and physical threat countermeasures of aircraft, the inventive system is complementary. It assures ADS-B cannot be misused to support more effective and enhanced cyber and physical attacks on aircraft.

While certain example or illustrative embodiments have been described, these embodiments have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method to prevent malicious misuse of automatic dependent surveillance-broadcast (ADS-B) messages transmitted by a first aircraft, comprising:
    inserting false aircraft position and movement information into an ADS-B Out signal to be transmitted by the first aircraft, and broadcasting from the first aircraft the ADS-B Out signal comprising true aircraft position and movement information for the first aircraft and false aircraft position and movement information for the first aircraft; and receiving the ADS-B Out signal broadcast by the first aircraft, comparing the received information to known flight paths and sensor data, determining the true aircraft position and movement information of the first aircraft, and determining the false aircraft position and movement information of the first aircraft.

2. The method of aircraft signal transmission of claim 1, further comprising:
    determining position and movement information of a neighboring aircraft in proximity to the first aircraft; and
    computing false movement information for the first aircraft, wherein the false movement information of the first aircraft does not overlap with a flight trajectory of the neighboring aircraft.

3. The method of claim 2, wherein the computing is performed at least partially by an off-board system not located on the first aircraft.

4. The method of claim 1, wherein the comparing and determining are performed by at least one of the first aircraft, a neighboring aircraft, or ground based systems.

5. The method of claim 1, further comprising inserting the false information into the signal transmission in each of a plurality of time periods, wherein the false information of a first time period is used for computing the false information for inserting in a second time period.

6. An avionics system for preventing misuse of automatic dependent surveillance-broadcast (ADS-B) messages transmitted by an aircraft, comprising:
    an ADS-B transponder configured to generate "ADS-B Out" messages to be broadcast for reception by other aircraft and an authorized ADS-B ground system equipped with "ADS-B In" technology, wherein the ADS-B Out messages include an identity code and position, velocity, and time information; and
    an airborne processor operatively coupled to the ADS-B transponder and configured to cause the ADS-B transponder to transmit authorized bogus ADS-B Out messages containing bogus position information; wherein the authorized bogus ADS-B Out messages are configured to be received by another system, compared to known flight paths and sensor data, and used to determine true and false aircraft position and movement information of the aircraft.

7. The avionics system of claim 6, further comprising a ground-based air traffic management (ATM) system processor configured to enable the authorized ADS-B ground station to recognize as false the bogus position information.

8. The avionics system of claim 7, wherein the ground-based ATM system processor is further configured to use a radar feed or multilateration data feed to identify authorized bogus ADS-B Out messages.

9. The avionics system of claim 6, wherein the airborne processor is further configured to employ a first algorithm for causing the ADS-B transponder to generate the authorized bogus ADS-B message so as to ensure that a computed bogus flight trajectory of the aircraft is non-overlapping with actual trajectories of other aircraft in the vicinity of the aircraft.

10. The avionics system of claim 6, wherein the airborne processor is further configured to employ a second algorithm for transmitting authorized bogus ADS-B Out messages, the second algorithm comprising the following steps:
    (1) transmitting a first ADS-B Out message (A1_1) containing an actual position of the aircraft at a first time (t_1);
    (2) transmitting a second ADS-B Out message (A1_2) containing a bogus position of the aircraft (BogusA1_position1_t1) within a first transmission period after the first time (t_1); and
    (3) repeating step (2) a number of times (m) so as to transmit m bogus messages within said first transmission period.

11. The avionics system of claim 6, wherein the airborne processor comprises a software application running on a flight management system (FMS).

12. The avionics system of claim 6, wherein the airborne processor is further configured to decode and detect maliciously spoofed ADS-B Out messages received by the aircraft.

13. A non-transitory computer readable medium comprising instructions to be executed by a processor, comprising:
    instructions for inserting false aircraft position and movement information into a signal to be transmitted by a first aircraft; and
    instructions for broadcasting from the first aircraft a signal transmission comprising true aircraft position and movement information for the first aircraft and false aircraft position and movement information for the first aircraft; wherein the signal broadcast by the first aircraft is configured to be received by another system, compared to known flight paths and sensor data, and used to determine the true and false aircraft position and movement information of the first aircraft.

14. The computer readable medium of claim 13, further comprising:
    instructions for determining position and movement information of a neighboring aircraft in proximity to the first aircraft; and
    instructions for computing false movement information for the first aircraft, wherein the false movement information of the first aircraft does not overlap a flight trajectory of the neighboring aircraft.

15. The computer readable medium of claim 14, wherein the instructions are configured for execution by a processor on the first aircraft.

16. The computer readable medium of claim 14, wherein the instructions are configured for execution by a processor remote from the first aircraft.

17. The computer readable medium of claim 13, further comprising:
    instructions for comparing the transmitted data of the first aircraft to known flight paths and received sensor data;
    instructions for determining the true aircraft position and movement information of the first aircraft; and
    instructions for determining the false aircraft position and movement information of the first aircraft.

18. The computer readable medium of claim 17, wherein the instructions for comparing and instructions for determining are executed by at least one of the first aircraft, a neighboring aircraft in proximity to the first aircraft, or ground based systems.

19. The computer readable medium of claim 13, further comprising instructions for inserting the false information into the signal transmission in each of a plurality of time periods, wherein the false information of a first time period is used for computing the false information for inserting in a second time period.

* * * * *